Aug. 11, 1936.                W. J. KERR                2,050,614
TIME CYCLE CONTROLLER
Filed May 31, 1935
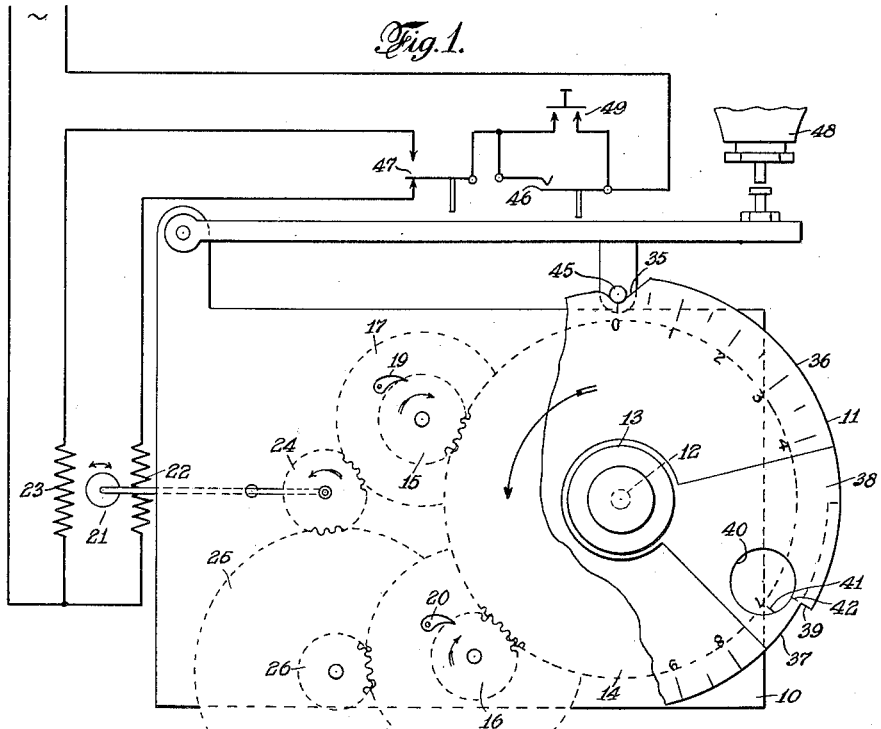
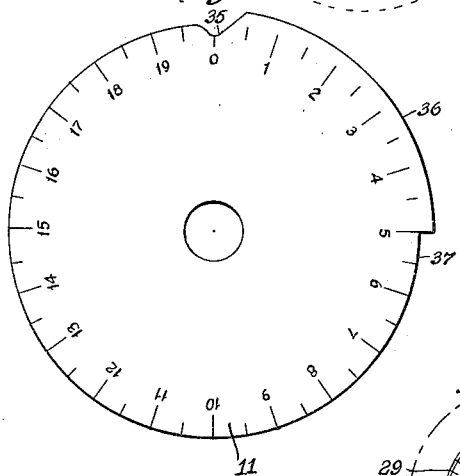
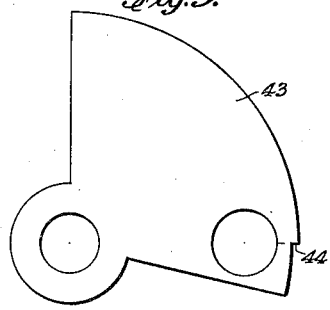
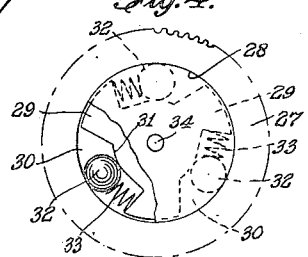
INVENTOR.
WILLIAM J. KERR
BY
ATTORNEY.

Patented Aug. 11, 1936

2,050,614

UNITED STATES PATENT OFFICE 2,050,614

TIME-CYCLE CONTROLLER

William J. Kerr, Waterbury, Conn., assignor to The Bristol Company, Waterbury, Conn., a corporation of Connecticut Application May 31, 1935, Serial No. 24,331

10 Claims. (Cl. 161—7)

The invention relates to so-called time-cycle control apparatus whereby an automatic control may be had of a discontinuous process, for example, a process such as utilizes mechanisms operated by fluid agencies or by electrical energy. In these processes the flow of an operating medium to the different mechanisms is controlled primarily, for example, by relatively small valves or pilot means and the like, which are in turn under the control of a cam or a group of cams or equivalent mechanical means driven generally by a low-power motor.

The present invention has for an object the provision of novel means for affording an adjustment of the relative times of occurrence of the several events entering into a complete cycle of operations of the process or machine under control.

A further object of the invention resides in the provision of simple and readily manipulated means whereby the total time of the process cycle may be adjusted to any desired value within the limits of the instrument; and another object of the invention resides in the provision of a graduated dial forming part of the instrument and from which the value of the time interval desired may be read and selected.

Still another object of the invention resides in the provision of mechanism for effecting the aforesaid adjustment in such a manner that the relative timing of certain events in the cycle, for example, those at the beginning and at the end of the process, is fixed, the variable element being introducible only between these events.

In carrying out the invention, means are provided whereby the total time of one cycle of operation of the apparatus is divided into intervals during which the controlling mechanism may operate at different velocities, the time of operation at one velocity including the carrying out of the process under control, and that of operation at the other velocity comprising a "return" period, during which the control mechanism is restored to its initial position in readiness for another cycle of operation.

The novel cycle controller to this end comprises a cam driven alternatively from a single motor through either of two gear trains—one containing an even number of reductions, and the other an odd number, and each train including an overrunning clutch or ratchet mechanism. The motor utilized is of the reversible type, and when running in one direction is arranged to drive through one of the said trains, the ratchet mechanism in the other train running free. When the motor is operated in the opposite direction, the ratchet mechanism in the first-named train then runs free, and the latter train serves to drive the cam. Owing to the difference in the number of reductions in the two trains, the rotation of the cam is always in the one direction; but, by using different gear ratios in the respective trains, the speed of the cam will be governed by the overall ratio of the particular train through which it is operating and, therefore, by the direction of rotation of the motor.

A cam-follower device is provided to actuate the valves or contacts in the control system and also serves to operate electric switching means whereby the motor may be caused to operate in either direction in accordance with the cam advance, and thus to drive the cam in a predetermined direction at either speed. An adjustable cam sector provides for predetermining the relative times of operation at either of the two rotational velocities of the said cam.

The nature of the invention, however, will best be understood when described in connection with the accompanying drawing, in which:

Fig. 1 is a more or less diagrammatic representation of a cycle controller embodying the invention.

Fig. 2 shows in elevation a graduated controlling cam such as may be used in the instrument.

Fig. 3 shows in elevation a removable cam sector adapted for use with the cam.

Fig. 4 is a detail front elevation, with portion broken away, of a modified form of one of the elements embodied in the driving mechanism for the controlling cam.

Referring to the drawing, a base plate 10 is provided and upon which are conveniently mounted the principal parts of the control mechanism. For example, cam 11 is carried upon a shaft member 12 rotatably supported on said base plate and to which shaft it is secured by means of a thumb nut 13 adapted to screw upon its outer threaded end. Fixed to the shaft 12 behind the cam is also a gear member 14 having meshing therewith two pinions 15 and 16. Concentric with these pinions are mounted for rotation on the base plate 10 gears 17 and 18, each engaging its respective pinion through a ratchet member, indicated in Fig. 1 as pawls 19 and 20, respectively, and rotatable with the corresponding gears.

A reversible motor member 21 having electrical windings 22 and 23 adapted when energized to rotate the motor shaft in counter-clockwise and clockwise directions, respectively, drives a pinion member 24, which meshes directly with the gear 17, and, through an idler system embodying a gear 25 and a pinion 26, also driving the gear 18.

A preferred form which the ratchet member may take is shown in Fig. 4 which sets forth an over-running clutch arrangement embodying a steel ring 27 having a smoothly finished interior cylindrical surface 28 and enclosing a runner 29 having several cavities 30 on its outer periphery. Each of the cavities has a portion of its bottom surface, as at 31, of a curvature slightly spiral or eccentric relative to the inner surface of the ring 28. Within each of these cavities is placed a steel ball 32 having a diameter less than the maximum and greater than the minimum difference between the radii of the inner surface of the ring 28 and the spiral or eccentric surface 31. A spring member 33 rests in a recessed part of the cavity between a substantially radial portion of the runner 29 and a ball 32, said spring tending to press the ball into the narrower part of the space between the inner surface of the ring 28 and the eccentric surface 31 of the runner. The ring and the runner are concentrically mounted on a common shaft 34, the former corresponding to either the gear 17 or 18 in Fig. 1 and the latter to pinion 15 or 16. It will be apparent that if the ring be given rotation in a sense counter-clockwise relative to the runner, each of the balls will tend to roll into the wider portion of the cavity, against the influence of the spring, allowing the ring substantially free rotation relative to the runner. If, on the other hand, the ring be given a tendency to rotate in a sense clockwise relative to the runner, the balls will be gripped with a wedging action between the non-parallel surfaces bounding the cavities, making relative rotation impossible, and the two rotating elements will be firmly clutched together. Thus there is provided a ratcheting action substantially free of backlash, this device, sometimes known as an "infinite ratchet", being well known to the art, and not as such forming an essential part of this invention.

It will be seen that if the motor 21 is caused to rotate in a counter-clockwise sense, the gear 17 and the idler of the embodiment indicated in Fig. 1 will both rotate in a clockwise sense, so that the gear 18 will rotate in a counter-clockwise sense. The gear 17, rotating clockwise, will act through the pawl 19 to drive the pinion 15 in the same direction, whereby the gear 14 will be caused to rotate in a counter-clockwise sense, driving the cam member in the same direction. The pinion 16, being in permanent mesh with the gear 14, will rotate in a clockwise sense; and the pawl 20 will permit this action independently of the gear 18, which is rotating in the opposite direction, so that at this time the gear 18 and the pinion 16 will not be in mutual operative engagement.

Upon the motor 21 and the pinion 24 being caused to rotate in a clockwise sense, the gear 17 and the idler will rotate in a counter-clockwise direction, and the gear 18 will rotate clockwise, driving the pinion 16 in the same direction, and thereby the gear 14 and the cam member in a counter-clockwise sense. The pinion 15, being permanently meshed with the gear 14, will rotate in a clockwise sense, the pawl 19 permitting it to run without operative engagement with the gear 17 which will be rotating in the opposite direction. Thus it is apparent that in whichever direction the motor 21 may rotate, the cam 11 will be caused to rotate in a counter-clockwise sense, and that with an "infinite" ratchet, of the type set forth in Fig. 4, there will be no backlash; and that, upon reversal of the motor, the rotation of the cam will be substantially without interruption.

From an inspection of the gear trains as set forth in Fig. 1, it will be seen that the ratio of reduction between the pinion 24 and the gear 14 is much greater when motion is being transmitted through the idler system and the pawl 20 than when acting directly through the pawl 19, so that when the motor 21 is rotating in a counter-clockwise sense the rotation of the cam will be materially faster than when the motor is rotating in a clockwise sense and driving the cam through that train which includes the idler system.

The periphery of the cam 11 has portions representing three distinct radii, a short indented portion 35, of minimum radius, a portion 36 of maximum radius and a portion 37 of intermediate radius. Upon the visible face of the cam are inscribed uniformly spaced graduations, numbered from the portion 35 in a clockwise direction. Adjustably clamped to the cam by the thumb nut 13 is a removable sector 38, having peripheral portions concentric with those of the cam, and of a principal radius corresponding to that of the portion 36 of the cam periphery. A step 39 forming a part of this cam sector serves as a transition from the maximum to the intermediate radius. On the same radial line as the step 39 is an aperture 40, rendering visible the graduations 41 on the cam when the sector is clamped thereto; and an index line 42 inscribed in proximity to the aperture provides, in conjunction with the graduations on the cam, a measure of the time which would be required for the cam to rotate through the angle from its starting position to the position in which the follower reaches the step 39. To provide for flexibility in adjustment there may be provided several cam sectors having different angular spreads, the sector 43 with step 44 shown in Fig. 3, for example, having a wider angle than that shown in Fig. 1.

A follower 45 is adapted to engage the periphery of the cam and to vary its position in accordance with the radius of the particular cam portion engaged and to actuate either or both of two snap switches 46 and 47, in a manner hereinafter set forth, as well as to provide means of operating one or more pilot valves 48, whereby pneumatic control of certain devices and mechanisms may be effected.

The snap switches 46 and 47 are preferably of the type set forth in U. S. Letters Patent #1,960,020, granted May 22, 1934; and the switch 46 is of the single contact form and adjusted relatively to the cam follower so that its contacts will be open only when the follower is in engagement with the portion of the cam having minimum radius, as at 35. Switch 47 is of the single-pole double-throw form and is adjusted and wired so that with the cam follower in engagement with the portion 35 or 37 of the cam periphery the winding 22 of the motor 21 is connected to one side of the switch 47, while with the cam follower on the portion 36 of the cam periphery, having the maximum radius, the winding 23, instead of the winding 22, of the motor is connected to the switch 47. A normally open pushbutton switch 49, connectd to bridge the contacts of the switch 46, is located in a position convenient for manual operation.

The pilot valve 48, preferably of the type set forth in U. S. Letters Patent #1,890,494, granted December 13, 1932, is adapted to be opened when the cam follower is engaging the portion 36 of the cam periphery, and remains closed at all other times. By means of a piping system (not shown) this valve may be arranged to actuate pneumatically controlled devices or mechanisms forming no essential part of this invention; and it will be apparent to those versed in the art that by forming the cam and sector to have a greater number of portions of different radii, the cam follower may be caused to operate additional pilot valves at different times in the cycle of operation.

The operation of the device is as follows:

Assuming the cam to be in the position shown in Fig. 1, with the follower resting on the portion of minimum radius, the switch 46 will be open, cutting off all current to the motor 21; and the mechanism will remain at rest with the pilot valve closed. Operation is initiated by the switch 49 being manually actuated, whereupon the winding 22 of the motor 21 will be energized. The motor will thus begin to rotate in a counter-clockwise sense, driving the cam in the same direction, and at the higher of the two possible velocities, as hereinabove set forth. The cam follower 45 will at once be engaged by the inclined portion of the cam periphery, and will rise from the minimum radius at 35, first closing the contacts of switch 46, and, as it reaches the maximum radius, throwing over the double-throw switch 47, and at the same time opening the pilot valve 48.

The closing of the switch 46 provides an alternative circuit for the motor current, so that the manually actuated switch may be released. The throwing of switch 47 de-energizes winding 22, and at the same time energizes winding 23 of the motor 21, so that the rotation of the motor is substantially instantaneously reversed, causing the cam to be driven through that gear train which includes the idler, and to rotate in the same direction as before, but at a materially lower speed, as hereinbefore set forth. At the same time, the opening of the valve 48 initiates the normal cycle of the process under control.

This condition will continue as the cam rotates and the portion of the periphery 36 having the maximum radius passes slowly beneath the follower, which will maintain its deflected position as the periphery of the cam sector 38 replaces that of the cam, until the step 39 is reached. As the follower drops to the portion of intermediate radius 37, the valve 48 will be closed and the process under timing control automatically terminated.

Since the cam sector 38 is subject to angular adjustment relative to the cam 11, the time interval between initiation and termination of the cycle may be adjusted to any desired value, and this value may be read directly from the graduations of the cam as viewed through the aperture 40.

As the cam follower drops off the step 39 from the maximum to the intermediate radius, not only will the valve 48 be closed, but the switch 47 will be thrown over, completing the electrical circuit through the winding 22, instead of the winding 23, of the motor 21, so that the motor will be reversed, and the cam will immediately begin to rotate at its higher velocity as hereinabove set forth. This will continue until the cam follower drops into the indented portion 35 of the cam, whereupon the switch 46 will be opened and the mechanism brought to rest in its initial position, thus completing the cycle of operation.

I claim:

1. Timing apparatus for time-cycle controller means embodying pilot means and mechanical means for actuating the same, comprising rotatable cam means adapted for engagement with said mechanical actuating means and including an adjustable cam portion, a reversible electric motor, two gear trains intermediate said motor and said cam means, one having an even and the other an odd number of reductions, disengaging means included in said trains for permitting elements of the same to run free according to the direction of rotation of the motor and electrical switching means operated through the action of said cam means for reversing the direction of rotation of said motor.

2. Timing apparatus for time-cycle controller means embodying pilot means and mechanical means for actuating the same, comprising rotatable and graduated cam means adapted for engagement with said mechanical actuating means and including an adjustable cam portion provided with a window cooperating with the graduations of the cam means proper, a reversible electric motor, two gear trains intermediate said motor and said cam means, one having an even and the other an odd number of reductions, disengaging means included in said trains for permitting elements of the same to run free according to the direction of rotation of the motor, and electrical switching means operated through the action of said cam means for reversing the direction of rotation of said motor.

3. In control apparatus including pilot means: timing means for governing a sequence of events in a complete cycle of operation and comprising a reversible electric motor for driving the timing means through the cycle, and circuits therefor, gear members operatively associated therewith and having portions engaging said motor for rotation respectively in opposite directions, rotatable cam means driven by the gear members substantially continuously in one direction during a complete cycle of operation, a follower adapted for engagement with the cam means to control the pilot means, a plurality of electric switching means connected in said electrical circuits and actuated by said follower, one being adapted for control of the direction of rotation of the motor and another for completing a circuit thereto.

4. In control apparatus including pilot means: timing means for governing a sequence of events in a complete cycle of operation and comprising a reversible electric motor for driving the timing means through the cycle, and circuits therefor, gear members operatively associated therewith and having portions engaging said motor for rotation respectively in opposite directions, adjustable rotatable cam means driven by the gear members substantially continuously in one direction during a complete cycle of operation, a follower adapted for engagement with the cam means to control the pilot means, a plurality of electric switching means connected in said electrical circuits and actuated by said follower, one being adapted for control of the direction of rotation of the motor and another for completing a circuit thereto, and a by-passing switch for the latter switch to initiate the operation of the timing apparatus.

5. In control apparatus including pilot means: timing means for governing a sequence of events in a complete cycle of operation and comprising a reversible electric motor for driving the timing means through the cycle, and having a plurality of circuits, gear members operatively associated therewith and having portions engaging said motor for rotation respectively in opposite directions, a rotatable member driven by the gear members and including a cam element, a follower adapted for engagement with the cam element to control the pilot means, switching means controlled by said follower and embodying two switch devices, the one including a normally open contact, and the other a normally closed contact and a normally open contact, the closed contact and the normally open contact of the first-named switch device being in circuit with each other, and a by-pass circuit about said normally open contact of the first-named switch, the two said contacts of the second-named switch being connected to respective circuits of the motor to effect rotation thereof in opposite directions in accordance with the energization of one or other of the circuits through the said contacts of the last-named switch device.

6. In control apparatus including pilot means: timing means for governing a sequence of events in a complete cycle of operation and comprising a reversible electric motor for driving the timing means and circuits therefor, rotatable cam means driven from the motor substantially continuously in one direction during a complete cycle of operation, a follower adapted for engagement with the cam means to control the pilot means, a plurality of electric switching means connected in said electrical circuits and actuated by said follower, one being adapted for control of the direction of rotation of the motor and another for completing the circuit thereto, a plurality of gear trains having different ratios intermediate the reversible motor and the cam means, and disengaging means included in said trains allowing one to run free when another is in operative engagement with said motor means and said cam means.

7. In control apparatus including pilot means: timing means for governing a sequence of events in a complete cycle of operation and comprising a reversible electric motor for driving the timing means and circuits therefor, rotatable cam means driven by the gear members substantially continuously in one direction during a complete cycle of operation, a follower adapted for engagement with the cam means to control the pilot means, a plurality of electric switching means connected in said electrical circuit and actuated by said follower, one being adapted for control of the direction of rotation of the motor and another for completing a circuit thereto, a plurality of gear trains adapted for alternative engagement between said reversible motor and said cam means according to the direction of rotation of the former, and disengaging means included in said trains for permitting one or other of the same to run free.

8. Timing apparatus for time-cycle controller means embodying pilot means and mechanical means for actuating the same, comprising rotatable cam means adapted for engagement with said mechanical actuating means, a reversible electric motor, two gear trains intermediate said motor and said cam means, one having an even and the other an odd number of reductions, disengaging means included in said trains for permitting elements of the same to run free according to the direction of rotation of the motor, and electrical switching means operated through the action of said cam means for reversing the direction of rotation of said motor.

9. In control apparatus including pilot means: timing means for governing a sequence of events in a complete cycle of operation and comprising a reversible electric motor for driving the timing means and circuits therefor, rotatable cam means driven from the motor substantially continuously in one direction during a complete cycle, two gear trains intermediate the motor and the cam means, and having different overall ratios, and each of said trains containing means permitting said train to run freely in one direction of rotation of the motor, and means operated by said cam means for reversing the direction of said rotating motor.

10. In control apparatus including pilot means: timing means for governing a sequence of events in a complete cycle of operation and comprising a reversible power means for rotating the timing means, rotatable cam means driven from the power means substantially continuously in one direction during a complete cycle, two gear trains intermediate the power means and the cam means, one having an even number, and the other an odd number, of reductions, and each of said trains containing means permitting said train to run freely in one direction of rotation of the power means, and means operated by said cam means for reversing the direction of rotation of said power means.

WILLIAM J. KERR.